Oct. 15, 1929.                R. W. BABSON                  1,731,839
            CHECK CONTROLLED APPARATUS FOR MEASUREMENT
                   AND PAYMENT OF INTANGIBLE VALUES
                    Filed Aug. 30, 1928      4 Sheets-Sheet  4

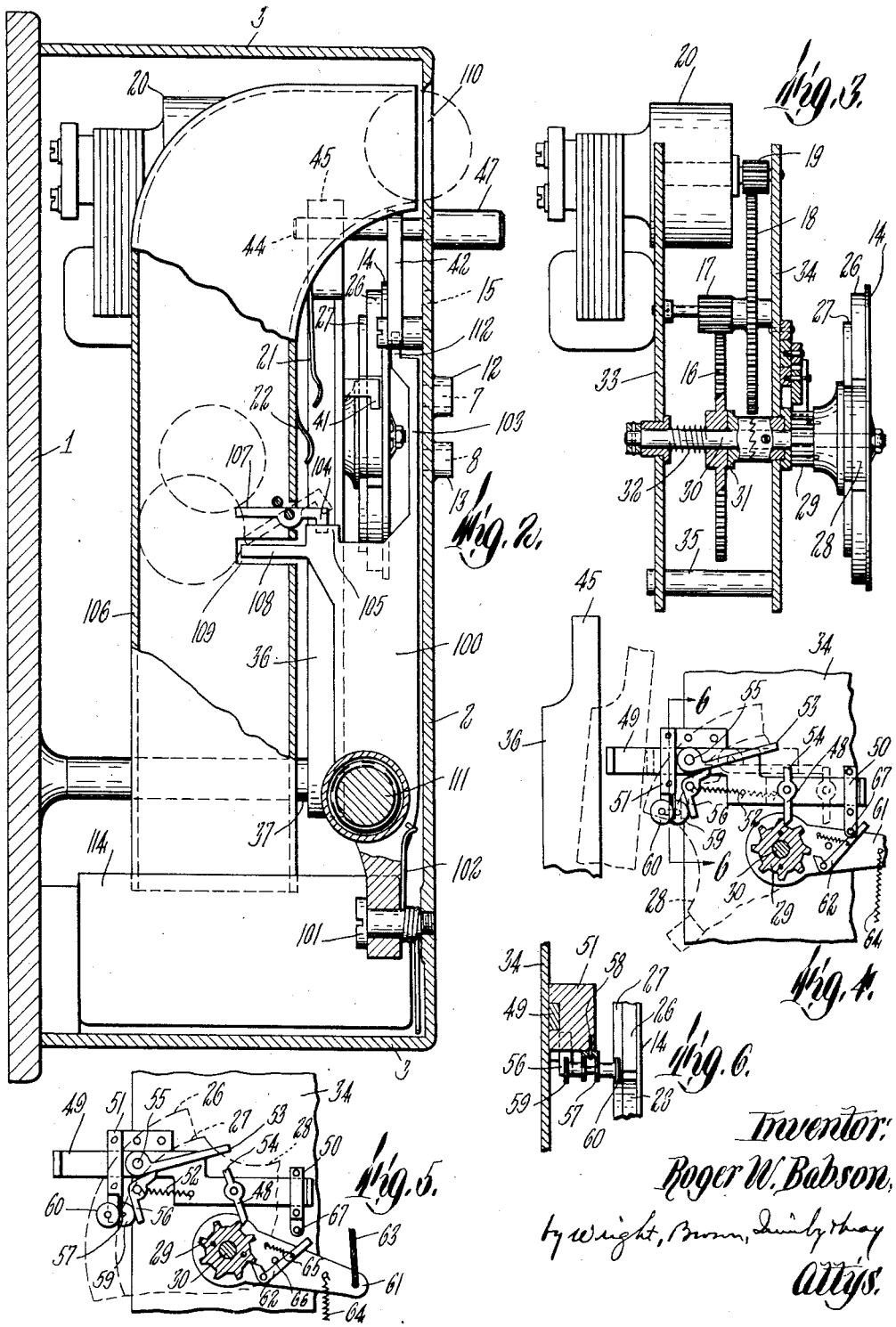

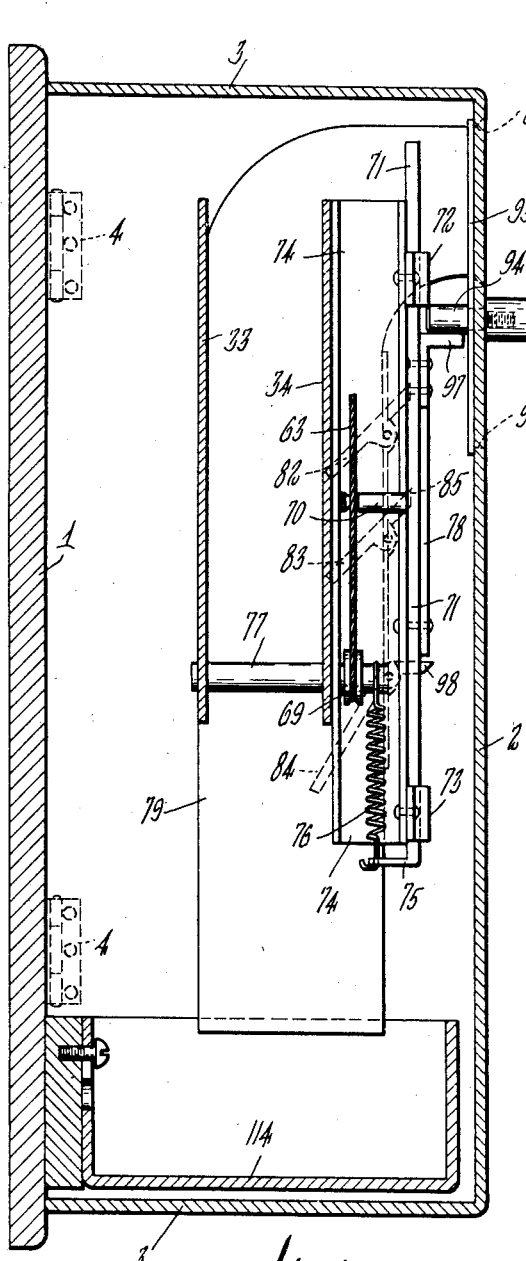
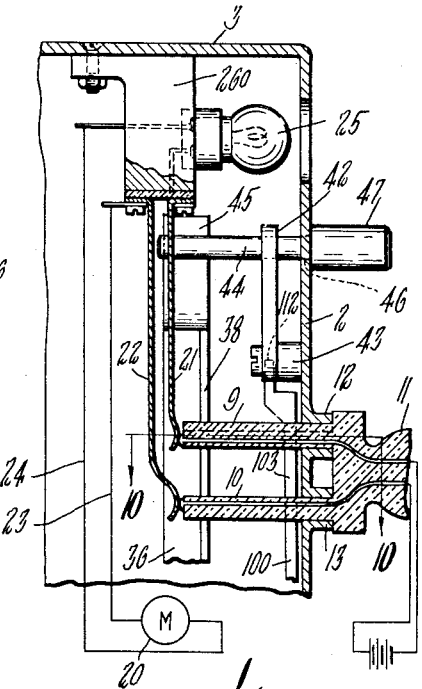
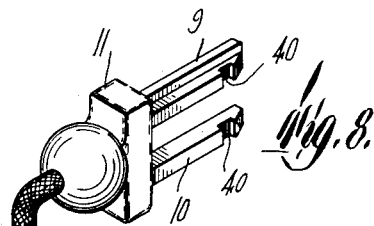
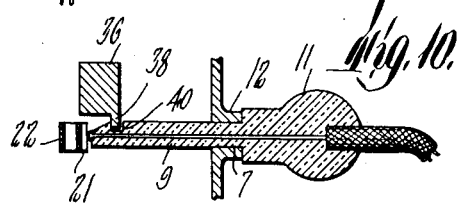

Inventor:
Roger W. Babson,
by Wright, Brown, Quinby & May
attys.

Patented Oct. 15, 1929

1,731,839

UNITED STATES PATENT OFFICE

ROGER W. BABSON, OF WELLESLEY, MASSACHUSETTS

CHECK-CONTROLLED APPARATUS FOR MEASUREMENT AND PAYMENT OF INTANGIBLE VALUES

Application filed August 30, 1928. Serial No. 303,020.

The present invention relates to apparatus for measuring the use or occupancy of space, or other intangible values or products, on a time basis, and insuring payment for such use or occupancy at a predetermined rate. One of the specific objects to which the invention is applicable is in connection with parked automobiles for measuring the time of occupancy by the automobile of the parking space and causing payment for such occupancy automatically, and with no other personal attention than that of the owner of the automobile in placing one or more coins, or checks or tokens representing monetary value, in a designated depository. In connection with this particular use, it has been a part of my object to provide means by which the spaces along the sides of city streets, in which automobile owners frequently park their cars, may be made to return a revenue to the municipality when so used, as well as to procure payment for the use of private or other special parking spaces. It is well known that the parking privileges on city streets are much abused by some individuals, who frequently leave their cars parked much beyond the legal limit; and it is practically impossible to eliminate this abuse by the means and methods hitherto available. In this connection my invention both tends to diminish the amount of parking beyond the prescribed time limits, thus permitting use of the same spaces by a greater number of persons, and produces a revenue to the municipality for use beyond the prescribed limit.

Numerous other purposes may likewise be served by the application of the principles of my invention in substantially the form herein illustrated, or in slightly modified forms, wherefore it is to be understood that I claim the novel features of apparatus and combination herein disclosed for all the purposes to which they may be applicable, as well as for the specific purpose of measuring the time of, and obtaining payment for, automobile parking.

The characteristics of the invention are best stated in connection with a description in detail of one particular embodiment thereof. Such an embodiment, designed particularly for use in connection with parked automobiles, is shown in the accompanying drawings, in which,—

Fig. 2 is a cross section taken on line 2—2 of Fig. 1;

Fig. 3 is a detail cross section taken on line 3—3 of Fig. 1;

Figs. 4 and 5 are fragmentary detail views of the means for resetting the time indicator of the apparatus, showing such means in respectively different positions;

Fig. 6 is a detail sectional view taken on line 6—6 of Fig. 4;

Fig. 7 is a cross section taken on line 7—7 of Fig. 1;

Fig. 8 is a perspective view of a plug or connector designed to be used in connection with the apparatus;

Fig. 9 is in part a section on line 9—9 of Fig. 1, and in part a diagram of electrical connections, showing the plug operatively inserted in the apparatus;

Fig. 10 is a horizontal section on line 10—10 of Fig. 9;

Like reference characters designate the same parts wherever they occur in all the figures.

Figure 1:
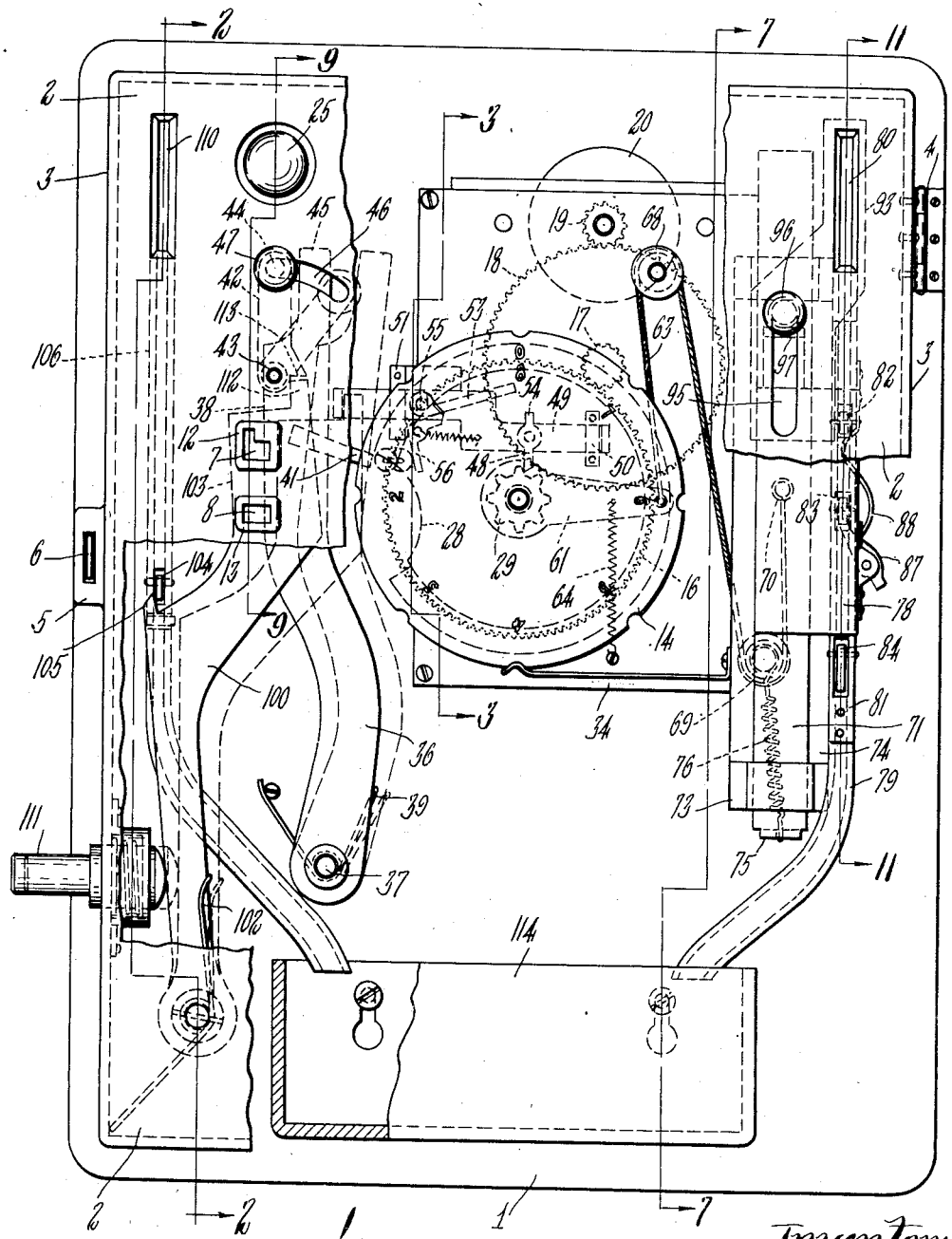
Fig. 1 is a front elevation, with a part of the cover broken away to show interior parts, of such apparatus.

The working parts of the apparatus here illustrated are enclosed between base or back plate 1 and a case or cover having a front wall 2, and enveloping side walls 3, which is mounted on the base by hinges 4 and carries a slotted lug 5 adapted to be secured in closed position by a hasp 6 and padlock, or a latch, or other suitable means.

In the front wall of the case are openings 7 and 8 (Fig. 1) suitably spaced and formed to admit the prongs 9 and 10, respectively, (Figs. 8 and 9) of the plug 11, which is connected to the automobile. These openings and the prongs, or one of them, are appropriately formed so that the plug can be inserted in only one position. On the outside of the case are hollow bosses 12 and 13, the bores of which form continuations of the openings 7 and 8, serving as guides and steadying means for the prongs of the plug.

For the specific purpose before mentioned, it is intended that the plug be connected to a flexible electric cable, the conductors of which are separately connected electrically to the prongs 9 and 10 and to the poles of the storage battery of the automobile; and that, when the plug is inserted, a circuit will be completed from the battery to set in operation the indicating mechanism of the device. Such indicating mechanism consists of a dial 14 bearing a series of suitable characters, which may represent hours and minutes, and are visible successively through an opening or window in the front wall of the casing, which window is indicated by dotted lines at 15 in Fig. 2. The dial is driven through a gear train consisting of a gear 16, pinion 17, gear 18, and pinion 19, from a synchronous electric motor or clock 20, as clearly shown in Figs. 1 and 3. A diagram of suitable electric connections between the plug and motor is shown in Fig. 9, as consisting of spring contact members 21 and 22 arranged to be engaged by the prongs 9 and 10, respectively, and conductors 23 and 24 leading therefrom to the motor. An electric lamp or equivalent telltale 25 is preferably interposed in this circuit. The contact springs and socket of the lamp are shown as mounted on and suitably insulated from a block 260 which is secured on the inside of one of the side walls of the casing.

The dial 14 is mounted and suitably secured on the outer end of a drum or disk which has two stop surfaces 26 and 27, shown in Fig. 3, which are coaxial, and cylindrical except for a recessed or interrupted sector 28, shown by dotted lines in Figs. 1 and 4. Said disk and a ratchet wheel 29 are secured on a shaft 30, on which the gear 16 is rotatably mounted, and are driven from said gear through a friction clutch 31, the hub of said gear being pressed against the face of the clutch by a spring 32. Shaft 30, as also the pivots of the driving gear train, previously described, are mounted in a movement frame consisting of plates 33 and 34, and a suitable number of connecting and spacing posts 35; which frame is secured in any desired manner in the casing.

In its embodiment as a parking meter for public streets on which a limited period of free parking is permitted, the apparatus is designed to hold the plug securely against accidental withdrawal, but so that it may be withdrawn without payment, at any time during the free parking period, but will be positively locked upon expiration of the limit and until coins or the like to the required value have been inserted. For thus holding and securing the plug, I provide a latch, or releasable lock, cooperating with the above named stop drum or disk, which serves as a positive obstructor or lock, as follows. A latch lever 36, pivoted on a stud 37 is formed with an edge flange 38 (Fig. 1) which crosses a part of the space occupied by the prongs 9 and 10 and is normally urged by a spring 39 into notches 40 (Fig. 8) in one side of the prongs. The latter are beveled at their ends to displace the lever when inserted, whereby the plug is automatically latched releasably. A lug or finger 41, rigid with the lever 36, projects toward the surface 26 of the stop disk, which blocks it at all times except when the recess 28 is beside the finger. Said recess is so positioned and of such length that it permits releasing movement of the latch when the dial is in zero or starting position and for a length of time equal to the free parking time after the clock or motor has been started. For moving the latch to release the plug, a lever 42 is pivoted to the front wall 43 of the case carrying a stem 44, which crosses the end extension 45 of the latch and protrudes through a slot 46 in said wall and on which is a handle knob 47.

It is necessary, when thus releasing the plug, to return the dial and stop disk to the normal zero or starting position, ready for the next use. To do this, the ratchet wheel 29 comes into play, actuated by a pawl 48 carried by a slide bar 49 which is supported slidingly by guides 50 and 51 secured to the movement plate 34. One end of the slide bar 49 extends near to the latch lever 36 and is arranged to be engaged and displaced by the latter when moved by the releasing handle 47. The movement so given to the bar shifts the pawl past the nearest tooth of the ratchet and, on the return of the bar effected by a spring 52, the pawl engages said ratchet tooth and returns the disk and dial to starting position.

The pawl 48 is pivoted loosely to the bar 49 and is yieldingly held, by gravity or otherwise, in the upright position shown in Figs. 1 and 4. It is adapted to swing freely to either side of this position except when prevented by the placement of a stop 53 in the way of an abutment or finger 54 on the pawl. Stop 53 is part of an arm pivoted at 55 to slide 49 and actuated by a bell crank lever 56 which is pivoted to the adjacent frame plate, and one arm of which underlies the stop lever while the other arm engages one end of a transverse rock lever. In the form shown in Figs. 4, 5 and 6, the rock lever above referred to consists of a block 57 connected by a pivot 58 to the under side of the guide 51, and carrying a shaft projecting to opposite sides of the pivot, one end of which carries a roll 59 engaging the bell crank 56, and the other end carries a roll 60 bearing against the surface or shoulder 27 of the stop disk. This shoulder holds the rocker, bell crank, and stop, in the position shown in Figs. 1, 4 and 5, at all times except when the recess 28 passes beside the roll 60 and the latter is so located that the recess begins to pass it immediately after the time mechanism is started, and continues beside it throughout the distance corresponding to the time period of free parking. Hence when the time mechanism starts, the pawl 48 offers no obstacle to its motion, and the tooth of the ratchet 29 which is then beside the pawl is able to tilt it in the manner illustrated in Fig. 5. But within a short time after starting of the time mechanism, the recess 28 arrives beside the roll 60 and the stop 53 is allowed to descend. The stop then rests on the displaced abutment 54, ready to drop beside the abutment when the pawl is free to resume its normal upright position. This occurs when the slide 49 is displaced by the release handle 48 in the manner previously described; the pawl then being carried to the right of the ratchet tooth which previously engaged it and resuming its normal position. The stop 53, then dropping into place in front of the abutment 54, holds the pawl rigid and causes it to turn the ratchet back to starting position when the slide 49 is returned.

After the free parking time has elapsed, the further end of the recess 28 passes the stop finger 41 and the roll 60, whereupon the latch lever 36 is obstructed by the stop surface or shoulder 26, and the pawl stop 53 is held out of the way of the pawl through the coaction of the surface or shoulder 27 with roll 60. Thereafter the plug cannot be withdrawn until a coin controlled mechanism, which I will now describe, has been actuated a sufficient number of times. This coin controlled mechanism is manually operated to return the dial to starting position by steps, each equal to the distance that the dial has been turned during one hour or other prescribed time period for which unit payment by a coin of the prescribed value is required. Of course the unit time periods and rate of payment are arbitrary and may be variously fixed in various localities. For convenience of this explanation, however, I will assume that the rate of payment is twenty-five cents per hour and that therefore the resetting steps are each equal to one hour distance on the dial and may be given by the deposit of a quarter dollar in the coin slot.

The last mentioned resetting mechanism comprises an arm 61 mounted to turn freely about the shaft 30 and carrying a pawl 62 cooperating with the ratchet 29. To the arm is connected a flexible cord 63 by which force is applied for raising it so as to turn the ratchet; and a spring 64 is likewise connected to the arm, applying force, supplementing gravity, sufficient to lower the arm when the cord is slackened and carry the pawl past the next ratchet tooth. A spring 65 and stop 66 cooperate in a well understood manner with the pawl to permit its coaction with the ratchet. A disabling stop 67 is mounted on a fixed part of the frame in the path of the tail of the pawl, to arrest the latter and withdraw the pawl from the engaged ratchet tooth when the prescribed step of its motion has been completed, whereby the ratchet is left unobstructed and free to be propelled by the time mechanism.

Figure 11:
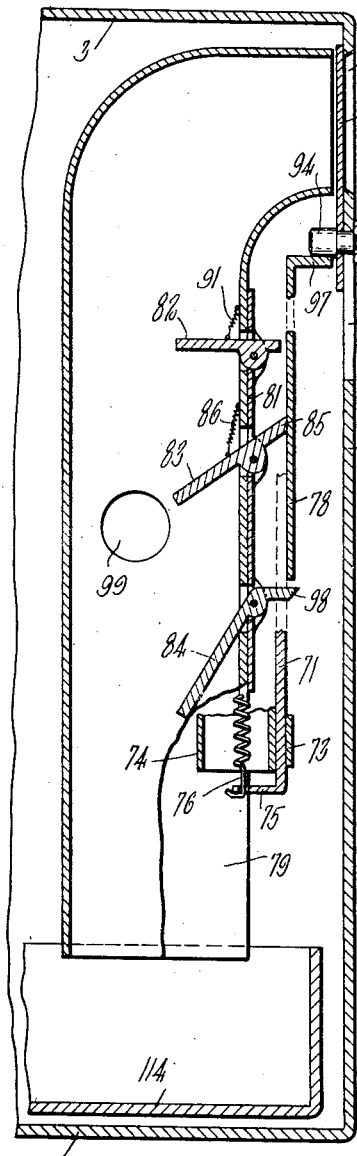
Figs. 11 and 12 are views taken in part on line 11—11 of Fig. 1 showing a part of the resetting means in different positions.

The cord 63 passes from the arm 61 upward over a guide pulley 68, thence downward and under a second guide pulley 69 (both guide pulleys being mounted on stationary pivot studs) and thence upward to a connection at 70 with a slide 71 which is movable vertically in guides 72 and 73 (Fig. 7) secured to a channel bar 74 which in turn is secured to a part of the time movement frame. The lower end of slide 71 carries a lug or hook 75 to which one end of a spring 76 is connected, the other end of the spring being anchored to a stationary stud 77. The tendency and effect of the spring is to hold the slide in the raised position shown in Figs. 1, 7 and 11, and to return it to that position after having been displaced by superior force. To the slide 71 is fastened a plate 78, the upper edge of which constitutes a shoulder or abutment to cooperate with a locking dog, presently described, in holding the slide temporarily in its lowered or displaced position.

A coin chute 79 is mounted within the casing beside the bar 74 and arranged with its entrance orifice in register with a slot 80 in the front wall of the casing. The plate 78 extends across the forward side or edge of the coin chute. Pivoted to a plate 81, which is fastened to the forward edge of the coin chute are a trip 82, a locking dog 83, and a stop arm 84, all of which project into the chute and to varying distances toward the rear edge thereof.

Figure 12:
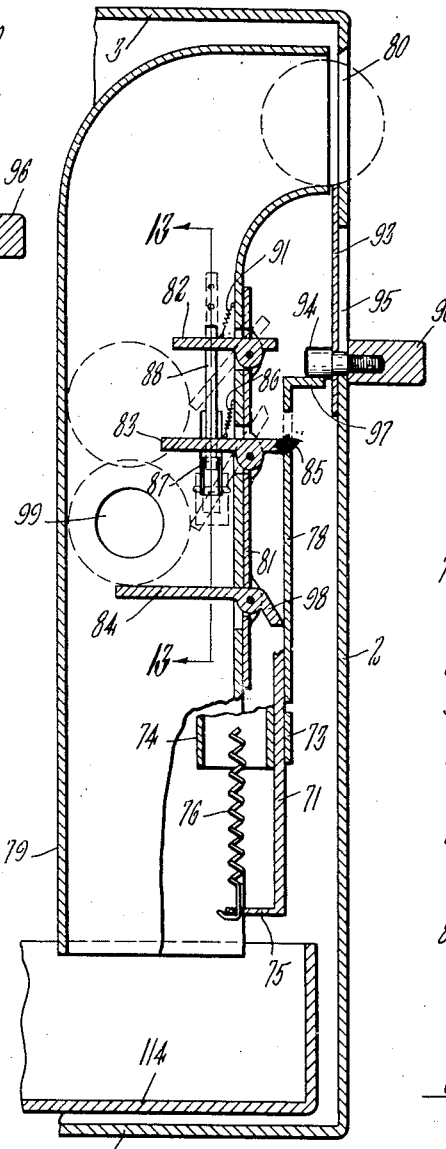
Figure 13:
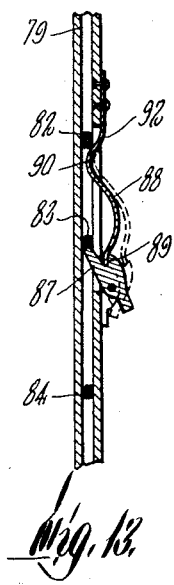
Fig. 13 is a cross section taken on line 13—13 of Fig. 12.

The locking dog 83 cooperates with the plate 78. It has a forwardly projecting arm 85 which bears against the rear side of plate 78 when the latter is raised (Fig. 11), and is caused by a spring 86 to lie across the upper edge of this plate when the latter is lowered (Fig. 12). The dog is secured in the latter position by a latch 87 (Fig. 13) which is pivoted on the side of the coin chute and extends through a slot therein so as to engage the inwardly projecting arm of the dog. An arm 88 is anchored at one end to the side of the chute, and its other end enters a notch 89 in the latch 87 whereby it is capable of transmitting motion and pressure in either direction to the latch. Said arm 88 has an offset or lateral cam projection 90 extending through the side of the chute directly under the position in which trip 82 is normally held by a spring 91; and is of resilient construction, at least in the part 92 between said offset and its point of anchorage, or is there flexible or articulated and spring actuated, in such fashion that it normally occupies the position shown by full lines in Fig. 13, but may be displaced to the dotted line position shown in said figure by depression of the trip 82.

A cover plate 93 is arranged on the inside of the casing back of the slot 80 and is movable up and down to cover and uncover the slot by means of a stud 94 projecting through a second slot 95 and carrying a handle 96. The stud 94 overlaps a bracket 97 secured to the slide 71.

The coin cannot be inserted in slot 80 until the cover plate 93 has been lowered. This is accomplished by depressing the handle 96, which simultaneously lowers the slide 71, putting spring 76 under tension, and slackening the cord 63. The pawl carrying arm 61 is thereby allowed to drop into the position shown in Fig. 5, where its pawl 62 is brought past one of the teeth of the ratchet.

When the cover plate and slide have been lowered enough to open the coin slot fully, the slide is locked by the dog 83 springing into the position where its inner arm is caught by the latch 87. Its outer arm is extended across the top edge of plate 76. A coin of the proper size and weight being then inserted, falls upon the trip 82, depressing it and thereby causing the latch 87 to be moved clear of the locking dog 83. The latter is then displaced by the conjoint action of the coin and the spring 76, releasing the slide 71. Spring 76 then raises the slide, which pulls on the cord 63 and raises the pawl carrying arm 61, turning the ratchet 29 and dial 14 through one step. This procedure is repeated, with insertion of an additional coin each time, as many times as the number of hours during which the car has remained parked beyond the limit of free parking time. The number of coins and actuations necessary is made known by the figures on the dial appearing through the sight opening. Finally the plug is released, and the dial brought to zero position by movement of the handle 47 in the manner previously described.

The trip 82 serves also as a means to prevent release of the locking dog by a coin smaller than that called for by the scale of payment. For that purpose it terminates short of the rear edge of the coin chute by a distance sufficient to let all of the smaller coins, for instance, all coins smaller than a quarter dollar, pass without displacing the trip; but it arrests and is operated by the coin of the proper size. The stop arm 84 is provided to arrest coins which have passed the trip arm and locking dog inoperatively. It also serves to retain the operative coin in position to prevent return of the locking dog into latched position in case the operator continues to hold down the handle 96 after depositing the coin. The stop arm therefore is provided with an inclined outer arm 98 which projects beneath the plate 78 when the latter is raised, thereby allowing the stop arm to tilt downwardly, but is displaced when the plate is lowered and then holds the stop arm horizontal. A window 99 is provided in the side of the chute through which the coin resting on the stop arm may be seen.

The foregoing description explains all of the mechanism sufficient for any situation where a limited period of free parking is permitted. But to meet the conditions where payment is exacted for the whole time, I provide the following additional devices.

An arm 100 is pivoted to a stud 101 and pressed upon by a spring 102 so that its upper end 103 obstructs the openings 7 and 8. It is locked in this position by a latch 104 engaging a lug 105 on the arm (Figs. 1 and 2). The latch 104 is pivoted to a coin chute 106 and has an arm 107 extending into the chute. Lever 100 has a finger or arm 108 beneath the latch arm 107 adapted to pass crosswise of the chute through a slot 109 cut in the walls thereof. This finger lies across the chute when the arm 100 is in the normal position.

The entrance end of coin chute 106 registers with a slot 110 in the front wall of the casing. A coin passed into the chute drops until arrested by the finger 108, meanwhile displacing latch 104 and holding it in the position shown by dotted lines in Fig. 2. A push stem 111 passes through the side of the casing and has a head on its inner end which bears on the arm 100. When the latch 104 is thus released, the operator, by pushing on the stem 111, may displace lever 100 and thus uncover the openings 7 and 8.

Until the lever 100 is thus displaced, movement of the handle 47 is prevented by a locking projection 112 on the lever 100 which lies beneath a shoulder 113 from the arm 42, and blocks it, as shown by dotted lines in Fig. 1.

Both coin chutes continue toward the bottom of the casing and discharge into a box 114.

The obstructing lever 100 and the parts associated therewith and last described are optional elements of the apparatus, which may be omitted from any apparatus made according to this invention to serve the use first described.

Various modifications may be made in the apparatus both when adapted to serve the purposes described and also enabling it to serve specifically different but analogous purposes. For instance, instead of causing the time motor to be operated by current supplied from the battery of an automobile, it may be supplied with current from a separate source and put in operation by a switch arranged to be closed by insertion of the plug. In that case the members 21 and 22 may be provided with normally separated contacts which are brought into engagement with one another by displacement of the arm 21 by the prong 9, the arm 22 being then arranged clear of the prong 10. Or the time mechanism may be driven by a spring motor which is set in motion and stopped by a trip which is operated by insertion or removal of the plug. The same principles may also be applied to such purposes as prepayment metering of electric current, etc. The plug, in the specific embodiment and combination herein described, is a connector which couples the time motor with an external source of power; but more broadly it is essentially a circuit closing body which, by its insertion into the casing of the meter, closes the circuit of the motor or time mechanism. More generically still, it is a controller body which, through intermediate connections or devices, causes the time mechanism to be started and stopped by its insertion and withdrawal respectively.

What I claim and desire to secure by Letters Patent is:

1. A parking meter for automobiles, comprising a receptacle for a contrivance attached to the automobile, locking means for securing such contrivance in said receptacle, a time mechanism operable automatically by placement of the contrivance in the receptacle, and coin controlled means for enabling said locking means to be released.

2. In combination with a connector adapted to be connected with an automobile or other movable body, a fixed meter having a recepacle for said connector, a time mechanism in said meter adapted to be automatically set in operation by insertion of the connector, a releasable lock for securing the connector in the meter, and means operated by release of the lock for returning the indicating element of said time mechanism to starting position.

3. In combination with a connector adapted to be connected with an automobile or other movable body, a fixed meter having a receptacle for said connector, a time mechanism in said meter adapted to be automatically set in operation by insertion of the connector, a releasable lock for securing the connector in the meter, means controlled by said time mechanism for preventing release of said lock, and coin controlled means for causing displacement of said lock securing means.

4. A parking meter for automobiles having a receptacle for receiving a connector attached to the automobile, a lock for holding such connector in the receptacle, a time mechanism arranged to be set in action by placement of the connector in the receptacle, a stop actuated by said time mechanism for preventing releasing movement of said lock, and coin controlled means for displacing said stop and thereby permitting release of the lock.

5. In an apparatus of the character described, the combination with a structure having a connector receptacle, of a lock for securing such connector in said receptacle, a time mechanism, means operated by the time mechanism for obstructing releasing movement of said lock, and coin controlled means for displacing said obstructing means.

6. The combination with a connector having separated terminals in electrical connection, respectively, with the poles of the storage battery of an automobile, of a meter having openings for the reception of said terminals, an electric time mechanism in said meter having an operating circuit including contact members arranged to be engaged by said terminals to complete a circuit through the automobile battery and the motor of said time mechanism, a lock for securing said terminals in the meter, an obstructor driven by said time mechanism for preventing release of said lock, and coin controlled means for permitting displacement of said obstructor into a position which permits release of the lock.

7. A parking meter comprising a structure having provisions for insertion of a connector attached to an automobile, a coin controlled obstructor to prevent insertion of said connector adapted to be released upon insertion of a coin, a lock for securing the inserted connector, a time mechanism, and a coin controlled mechanism controlling the securing and releasing of said lock.

8. In an apparatus of the character described, a time mechanism, a lock mechanism controlled by said time mechanism and having provisions for maintaining a locked condition when in one position, mechanism for returning said obstructor from such position after it has been placed therein by the time mechanism, and coin controlled means for permitting actuation of said last named mechanism.

9. In an apparatus of the character described having a lock, a time mechanism, a lock obstructor driven by said time mechanism and having provisions for preventing release of said lock when in one position, mechanism for returning said obstructor from such position after it has been placed therein by the time mechanism, and coin controlled means for permitting actuation of said last named mechanism, said last named mechanism being operable step by step and the coin controlled means being constructed to permit its actuation through a single step with the insertion of each coin.

10. A meter having provision for insertion of an external connector for coupling with an external body a time mechanism operated upon insertion of such connector, and a time indicator driven by said mechanism and arranged to be visible outside of the meter for indicating the elapsed time following insertion of the connector.

11. In an apparatus of the character described including a meter, a time mechanism, locking means operable by said time mechanism, and a time indicator movable by and with said locking means and being visible at the outside of the meter.

12. A coin controlled meter having provisions for reception of an inserted connector which is coupled with an external body, a lock for securing said connector, time controlled means for securing said lock and coin controlled means for releasing said lock.

13. A coin controlled meter as set forth in claim 12, including means to prevent insertion of said connector until after the deposit of a coin.

14. A meter as set forth in claim 12 comprising further an obstructor to prevent insertion of the connector, means whereby said obstructor may be placed in inoperative position, and a lock for preventing such placement of the obstructor adapted to be disabled by insertion of a coin.

15. In a metering apparatus of the character described having a lock, a releaser for said lock, a lock for preventing actuation of said releaser, and a coin operated trip for releasing the last named lock.

16. In a metering apparatus of the character described having a lock, a releaser, a lock for preventing actuation of said releaser, and a coin operated trip for releasing the last named lock, said trip being constructed and arranged to permit inoperative passing of coins having less than a predetermined dimension.

17. A metering apparatus comprising an enclosed casing having an entrance for a controller body, a time mechanism in said casing, and means operable by said controller body directly upon insertion in said entrance for causing said time mechanism to be started.

18. A metering apparatus comprising an enclosed casing having an entrance for a controller body, a time mechanism in said casing, means by which said controller body upon insertion in said entrance causes said time mechanism to be started, a latch arranged to be displaced by said body upon insertion thereof and means for interlocking the latch with the body to prevent withdrawal of the body.

19. A metering apparatus comprising an enclosed casing having an entrance for a controller body, a time mechanism in said casing, means by which said controller body upon insertion in said entrance causes said time mechanism to be started, a latch automatically operable upon insertion of said body to hold the body, and obstructing means actuated by said time mechanism for preventing release of said latch.

20. A metering apparatus comprising an enclosed casing having an entrance for a controller body, a time mechanism in said casing, means by which said controller body upon insertion in said entrance causes said time mechanism to be started, a latch automatically operable upon insertion of said body to prevent withdrawal of the body, obstructing means actuated by said time mechanism for preventing release of said latch, and coin controlled manually operated means for shifting said obstructing means into a non-obstructing relationship to the latch.

21. A coin controlled meter having provisions for reception of an inserted circuit closing body, a latch automatically operative upon insertion of said body for securing the latter, an electric motor, an electric circuit for said motor adapted to be closed by insertion of the circuit closing body, an obstructor operable by the electric motor for preventing release of the latch, and coin controlled manually operable mechanism for shifting said obstructor into non-obstructing relationship with the said latch.

22. The combination with a fixed body, of a connector coupled to an external body adapted to be inserted into the fixed body, and a time mechanism for automatically locking the connector to the fixed body after lapse of a predetermined time interval from insertion of the connector.

23. The combination with a fixed body, of a connector coupled to an external body adapted to be inserted into the fixed body, a time mechanism for automatically locking the connector to the fixed body after lapse of a predetermined time interval from its insertion, and coin-controlled means for unlocking the connector.

24. A coin controlled meter adapted to receive an inserted connector coupled to an external body, a time mechanism in the meter adapted to be set in action by insertion of such connector, and means controlled by said time mechanism for securing said connector against removal after lapse of a predetermined time from its insertion in the meter.

In testimony whereof I have affixed my signature.

ROGER W. BABSON.